E. C. C. KELLOGG.
Improvement in Calipers for Taper-Surfaces.

No. 129,349. Patented July 16, 1872.

Witnesses:

UNITED STATES PATENT OFFICE.

EBENEZER C. C. KELLOGG, OF HARTFORD, CONNECTICUT, ASSIGNOR TO HIMSELF, WALTER P. CHAMBERLAIN, AND NORMAN S. BREWER, OF SAME PLACE.

IMPROVEMENT IN CALIPERS FOR TAPER SURFACES.

Specification forming part of Letters Patent No. 129,349, dated July 16, 1872.

Specification describing an Improved Calipers and Gauge Attachment for Measuring Taper Surfaces, the invention of EBENEZER C. C. KELLOGG, of Hartford, in the county of Hartford and State of Connecticut.

This invention consists in the combination, with the arms of a gauge pair of compasses, or calipers, of bevel-pieces applied so as to be adjustable both longitudinally and angularly to said arms, whereby taper surfaces of different sizes and tapers may be accurately measured with the same instrument.

Figure 1:
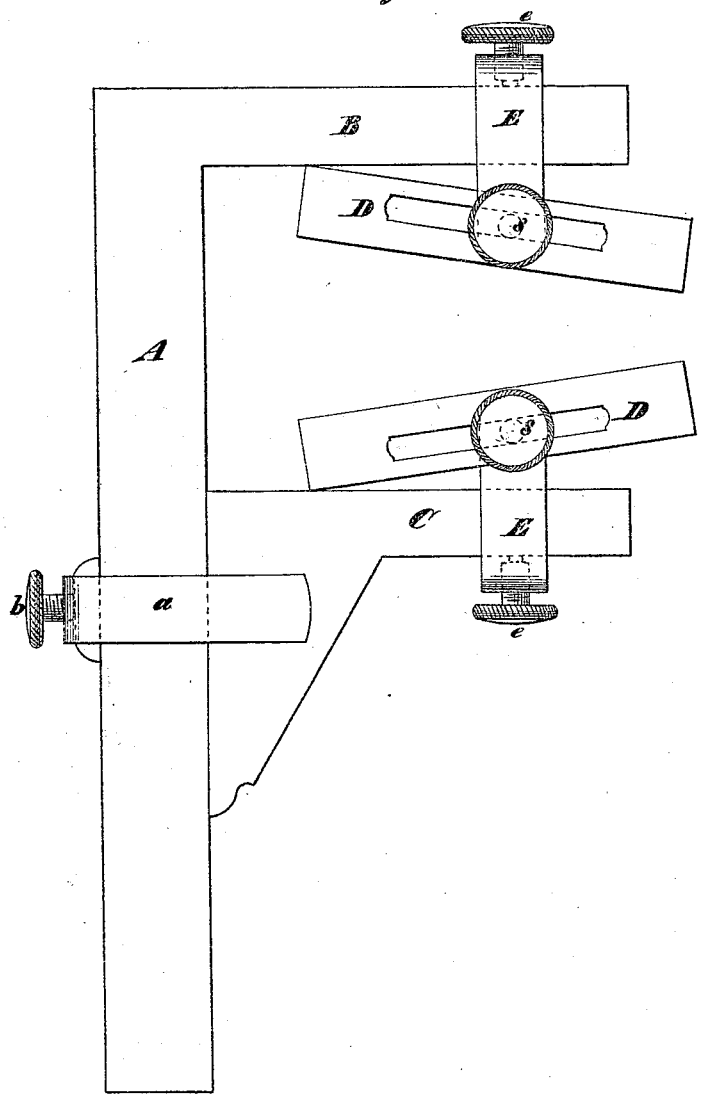
Figure 2:
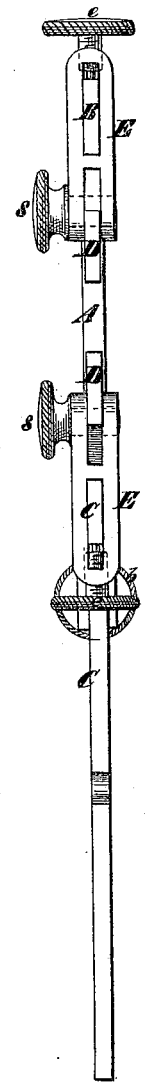

In the accompanying drawing, Figure 1 is a side view of a gauge having my attachment applied, and Figure 2 is a front edge view of the same.

Similar letters of reference indicate corresponding parts in both figures.

The gauge represented consists of a straight flat strip, A, of brass or other suitable metal, having at one end a perpendicular right-angled arm, B, and, sliding on its straight main portion, a movable arm, C. This arm has a broad base, as shown in Figure 1, and extending from the middle of said base is a loop or strap, $a$, that fits the main portion A of the gauge, and at the back this loop is provided with a set-screw, $b$, which, by impinging against the back edge of the said portion A of the gauge secures the movable arm C in position. D D are the bevel-pieces, which are secured between the bifurcated ends of loop-pieces E E, sliding on the arms B and C of the gauge. These straps or loop-pieces E E are secured in position on the aforesaid arms B and C by set-screws $e$ $e$ impinging against the backs of the latter. The bevel-pieces themselves are longitudinally slotted, and are secured in position by clamping-screws $s$ $s$ passing through their slotted portion and through the bifurcated ends of the straps or loops E E, between which they are clamped.

To use the instrument it is applied to either end of the taper surface to be measured, and the sliding arm C is adjusted so as to bring the two bevel-pieces in contact with the surface to be measured. The said bevel-pieces are then adjusted in the loop-pieces E, to lie against the sides of the surface. When properly adjusted the clamping-screws $s$ $s$ are screwed up to tighten and hold the bevel-pieces, and then the whole instrument is slipped sidewise off the surface, and the exact taper is then shown by the relative positions of the two bevel-pieces.

These bevel-pieces might, if slightly modified, be applied to ordinary calipers and dividers. They might also be so constructed that when the gauge lies on a table or other flat surface the bevel-pieces would be perpendicular to it.

Claim.

The combination with the arms of a gauge, pair of compasses, or calipers, of bevel-pieces D D, applied substantially as set forth, for the purpose specified.

EBENEZER C. C. KELLOGG.

Witnesses:
GEORGE G. SILL,
E. A. KUNKEL.